April 30, 1929.                    C. W. BOISE ET AL                    1,711,259
                        DISINTEGRATING OR MIXING APPARATUS
                        Filed Aug. 2, 1927          2 Sheets-Sheet 1
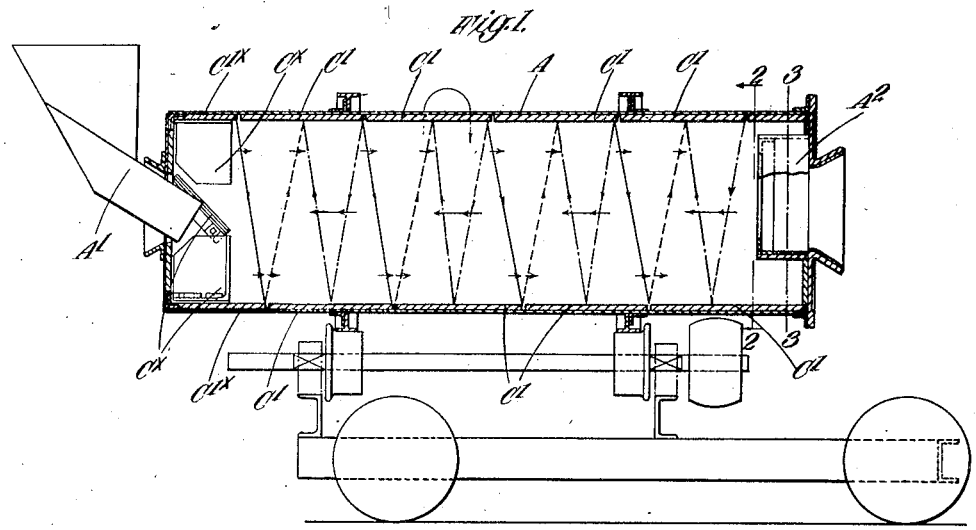
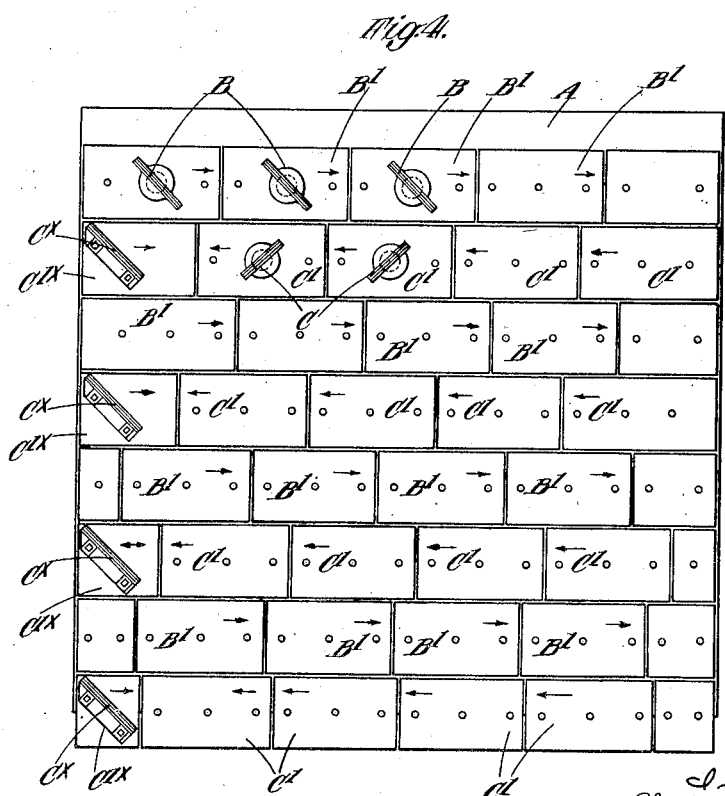

April 30, 1929. C. W. BOISE ET AL 1,711,259
DISINTEGRATING OR MIXING APPARATUS
Filed Aug. 2, 1927   2 Sheets-Sheet 2
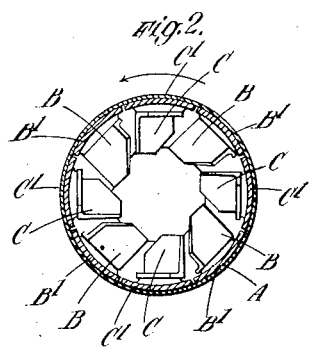
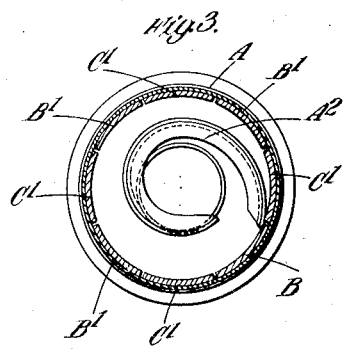
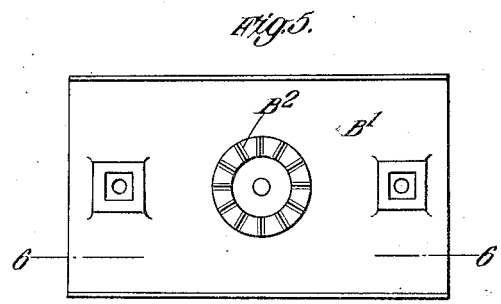
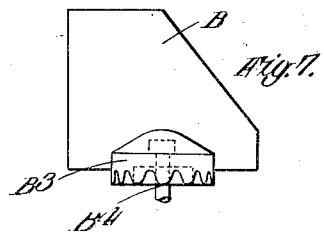
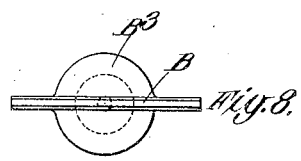

Patented Apr. 30, 1929.

1,711,259

UNITED STATES PATENT OFFICE.

CHARLES WATSON BOISE AND WILLIAM RUSSELL DEGENHARDT, OF LONDON, ENGLAND.

DISINTEGRATING OR MIXING APPARATUS.

Application filed August 2, 1927, Serial No. 210,042, and in Great Britain August 10, 1926.

This invention relates to apparatus for disintegrating clayey material or for mixing sand and cement or other materials, the said apparatus being of the kind comprising a rotary drum or barrel into one end of which the material to be disintegrated or mixed is fed, together with water or other liquid if required, and from the other end of which the disintegrated or mixed material is discharged, the disintegration or mixing being effected, during the passage of the material through the drum, by means of blades or scoops carried by the drum and so constructed and arranged that during the rotation of the drum some of them throw the material forward (i. e. towards the discharge end of the drum) and others throw the material backward (i. e. towards the feed end of the drum) but with somewhat less effect than the forward effect so that there is a continual progression of the material from the feed end of the drum to the discharge end, the difference in the forward and backward effects of the two series of blades preferably being obtained by making the blades that throw the material forward (herein termed the forward throw blades) of larger area than the blades that throw the material backward (herein termed the backward throw blades).

According to the present invention means are provided for enabling some or all of the blades to be angularly adjusted (preferably from the exterior of the drum when the latter is stationary) so that the rate of progression of the material through the drum can be varied to suit different materials or different conditions. In addition to altering the angular settings of the blades one or more of them may be reversed so as to assist as may be required in accelerating or retarding the progress of the material through the drum. The blades in the different rows are preferably arranged in staggered form and are preferably connected in a detachable manner to short liners or supports by means of bolts which pass through the drum and have nuts on the outside of the drum, the said liners being detachably connected to the drum.

In order that the said invention may be clearly understood and readily carried into effect the same will now be described more fully with reference to the accompanying drawings, in which:—

Figure 1 is an axial section shewing diagrammatically a form of apparatus in accordance with the invention, most of the blades having been removed for the sake of clearness of representation, Figure 2 is a section taken approximately on the line 2, 2 of Figure 1, Figure 3 is a section taken approximately on the line 3, 3 of Figure 1, Figure 4 is a development shewing the internal surface of the drum of Figure 1, with most of the blades again removed, Figure 5 is a plan on an enlarged scale of one of the liners or supports for the blades, Figure 6 is a section taken approximately on the line 6, 6 of Figure 5, Figure 7 is an elevation of one of the blades, and Figure 8 is a plan of Figure 7.

A is the drum or barrel which is rotated in any convenient manner and has a feeding chute $A^1$ passing through one end and a discharge device $A^2$ at the other end, this device in the example shewn being constituted by a spiral rib as is well understood.

B, B are the aforesaid forward throw blades which are attached in longitudinal rows (four in the example shewn) to the inside of the drum and C, C are the aforesaid backward throw blades which are also attached in longitudinal rows, alternating with the rows of forward throw blades, to the inside of the drum. The blades in the different rows are preferably arranged in staggered form, that is to say each forward throw blade in one row is placed somewhat in advance of the contiguous rearward throw blade in the next row, the extent of the staggering preferably varying as between the different rows as is shewn in Figure 4 so as to cause more thorough disintegration or mixing. The different blades B, C are detachably carried by short liners or supports $B^1$, $C^1$ respectively which are in turn detachably connected to the drum so that the blades or the liners or supports can readily be removed when required to be replaced by others. The said liners or supports are curved and are preferably arranged in contact with each other, or nearly so, in order to cover and protect the inner surface of the drum. The first blade (indicated by C×) preceding each row of backward throw blades C is preferably a forward throw blade as shewn in order to ensure a proper start of the material on its passage through the drum. Each of the forward throw blades B is made of larger area than the backward throw blades so that the material progresses through the drum by a series of forward and backward movements with the forward movements preponderating. The movements of the material are represented by the arrowed lines in Figures 1 and 4.

The blades C× are preferably attached in fixed angular positions to liners C¹× detachably connected to the drum, but the other blades B, C are attached to their liners B¹, C¹ in such a manner that these blades can have their angular positions adjusted for the purposes hereinbefore mentioned. The attachments are preferably as illustrated in Figures 5 to 8 (which shew one of the blades B and its liner B¹) that is to say the liner has a boss B² with a serrated upper surface and the blade has a boss B³ with a serrated lower surface co-operating with the serrated surface of the boss B². A bolt B⁴ with a nut on its outer end passes through the said bosses and through the drum A and serves to secure the blade B in its adjusted position. The said bolt is fixed to the boss of the blade so that by slackening off the nut (which is outside the drum) sufficiently to enable the blade to be pushed in to bring the serrations on the boss B³ out of engagement with the serrations on the boss B², the bolt can be turned to vary the angular setting of the blade or to reverse the blade as aforesaid, the nut being then tightened up to hold the blade in the new position. The outer end of the bolt may be marked with a cut to shew the angular setting of the blade.

What we claim and desire to secure by Letters Patent of the United States is:—

1. Disintegrating or mixing apparatus, comprising a rotary drum, members carried in said drum, some of these members serving to throw the material forwards towards the discharge end of said drum and some of said members serving to throw the material backwards towards the feed end of said drum, and means operable from the exterior of the drum for enabling some or all of said members to be angularly adjusted in order to vary the rate of progression of the material through said drum.

2. In disintegrating or mixing apparatus, the combination with the elements claimed in claim 1, of means for attaching the members in rows with the members in adjacent rows arranged in staggered form.

3. Disintegrating or mixing apparatus, comprising a rotary drum, members carried in said drum, some of these members serving to throw the material forwards towards the discharge end of said drum and some of said members serving to throw the material backwards towards the feed end of said drum, short liners in said drum, means for connecting said liners to the inner surface of the drum, bolts which are connected to said members and pass through said liners and through the drum, and nuts on the outer ends of said bolts where the latter project from the outer surface of the drum.

4. Disintegrating or mixing apparatus, comprising a rotary drum, members carried in said drum, some of these members serving to throw the material forwards towards the discharge end of said drum and some of said members serving to throw the material backwards towards the feed end of said drum, short liners in said drum, means for detachably connecting said liners to the inner surface of the drum, bolts which are connected to said members and pass through said liners and through the drum, and nuts on the outer ends of said bolts where the latter project from the outer surface of the drum.

CHARLES WATSON BOISE.
WILLIAM RUSSELL DEGENHARDT.